RANGE WORD GENERATOR

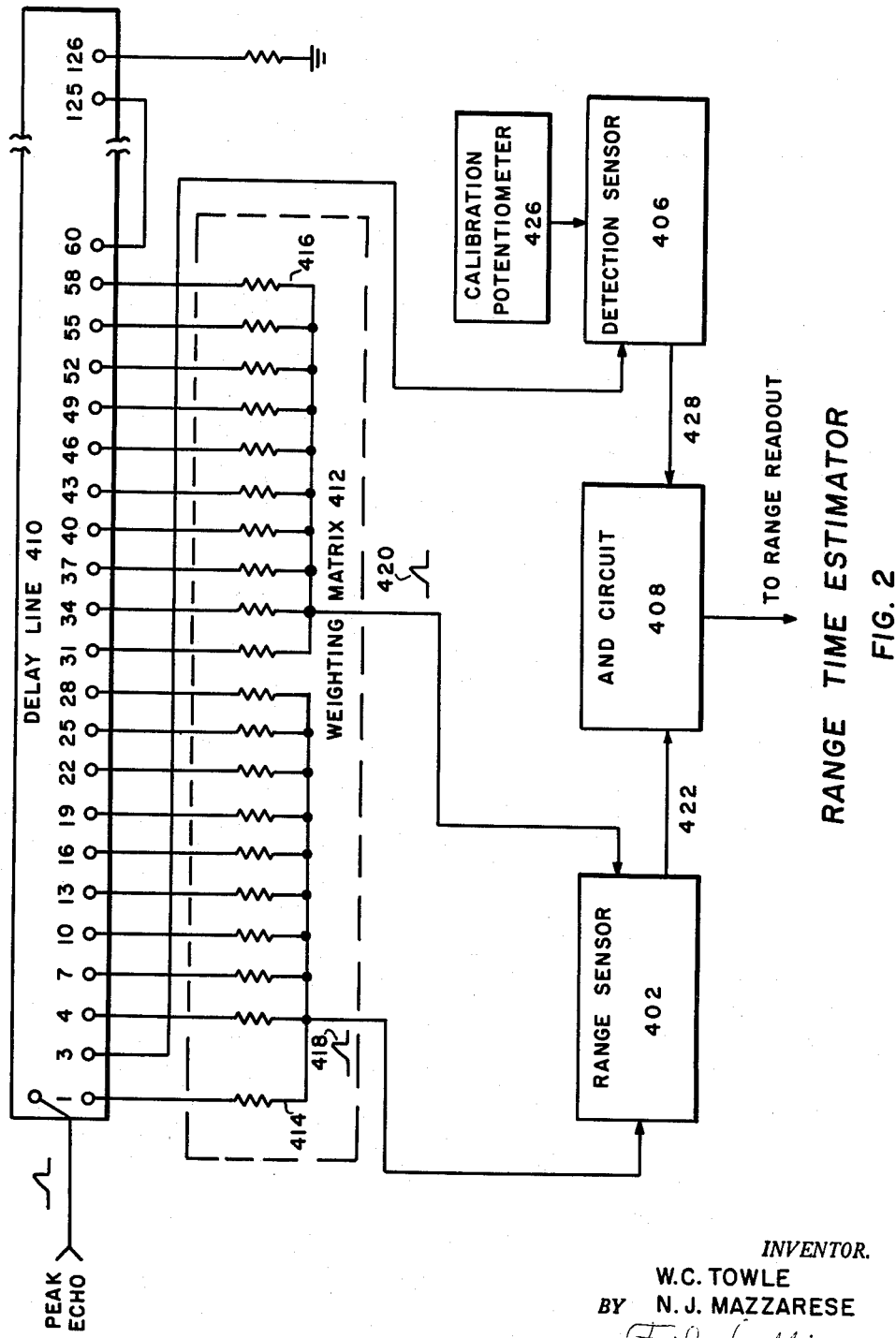

United States Patent Office 3,181,145
Patented Apr. 27, 1965

3,181,145
RANGE ESTIMATION OF RADAR ECHO SIGNALS
William C. Towle and Nick J. Mazzarese, Sudbury, Mass., assignors to Sylvania Electric Products Inc., a corporation of Delaware
Filed Mar. 15, 1961, Ser. No. 97,123
5 Claims. (Cl. 343—7)

This invention is concerned with radar systems and particularly with an improved range estimator useful in such systems.

When a surveillance radar sights a target, its range must be accurately determined. Hitherto, automated range estimators have been inaccurate because they fail to compensate for the presence of noise. In addition, they have been rather complex since they must accomplish many high speed digital functions necessary for the storing and sampling of information.

Accordingly, a primary object of this invention is to provide an improved range estimator and one which has the capability of automatically estimating target range to a greater degree of accuracy than has hitherto been practicable. A further object is to decrease the complexity and increase the reliability of radar range estimators.

These and related objects are accomplished in one embodiment of the invention by an automated range estimator which features a specialized combination of circuits for generating a digital word in binary notation representing the range of the target reported.

Other objects, features, and embodiments of the invention will be apparent from the following description and reference to the accompanying drawings, wherein:

FIG. 2 is a diagrammatic representation of a range time estimator.

Figure 1:
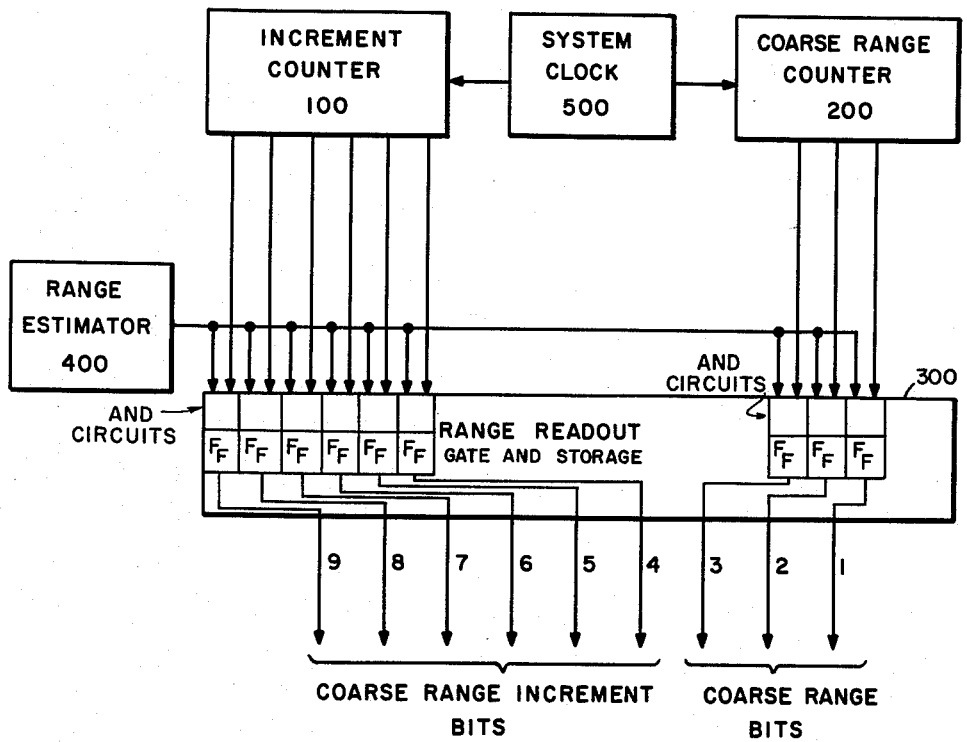
FIG. 1 is a block diagram of a range word generator.

As diagrammed in FIG. 1, the automated radar range estimator to be described as an illustrative embodiment of the invention comprises an increment counter 100, a coarse range counter 200, a range readout 300, and a range time estimator 400. Range time estimator 400 determines range time and gates a signal to the range readout 300. When this unit receives the range signal, it reads out the correct range time in binary notation according to the counters 100 and 200 which are driven by a system clock 500. The range word comprises nine bits. Bits 1-3 indicate in which coarse range block the target appeared; and, bits 4-9 indicate where within this coarse range block the target appeared.

Range time estimator

The range time estimator 400 of FIG. 1 is shown, in detail, in FIG. 2. It comprises a delay line 410, a resistor weighting matrix 412, a range sensor 402, a detection sensor 406, and an AND circuit 408.

Estimator 400 is operative to determine the range of a target from a radar system of the type described by Reintjes and Coate in "Principles of Radar," 1952, pp. 1-7. Range determination can be accomplished automatically, an automated data take-off, in which the present range estimator has particular utility being disclosed in co-pending application Serial No. 97,124, filed March 15, 1961, and assigned to the assignee of this application. As described therein, the true peak echo signal of a group of echo signals received by the radar is determined and reproduced in analog form, and applied to the input terminal of a multi-tap delay line 410 in which the weighted center of gravity of the echo pulse, and hence the range of the target producing it, is found.

Delay line 410 has twenty equally spaced output taps 1 through 58, the total delay of the line being equal to the pulse width of the peak echo which, in turn, is a function of the width of the transmitted pulse. Output tap 3 is connected to detection sensor 406, taps 60 and 125 are shorted together, and tap 126 is connected to ground through a resistor of a value equal to the characteristic impedance of the line; the portion of the delay line between taps 60 and 126 is not used in the determination of range time. The weighting matrix 412 is comprised of two groups 414, 416 of ten resistors each. Group 414 sums the voltages on the equi-spaced taps in the first half of the delay line and puts out an analog waveform 418 representing this sum, while group 416 sums the voltages on the last half of the delay line and puts out an analog waveform 420.

Range sensor 402 comprises a multivibrator comparator (ref. Millman and Taub, "Pulse and Digital Circuits," McGraw-Hill Book Co., Inc., 1956, pp. 475, 476) in series with a standard inverter and compares the weighted summation of the earlier part of the signal 418 to the weighted summation of the later part of the signal 420. At the time of voltage equality, it emits a pulse at its output terminal 422. The time interval between the pulse transmitted by the radar and the time of voltage equality is known as "range time" and is proportional to the range of the target producing the echo. Range sensor 402 continually compares signal 418 with signal 420 as the peak echo pulse travels along delay line 410 and is operative to produce a signal on line 422 when signals 418 and 420 have equal amplitudes, indicating that the weighted center of gravity of the peak echo pulse has been found.

This weighted center of gravity method of determining slope reversal time avoids errors due to random noise producing a false indication of slope reversal and is therefore more accurate than the straightforward slope reversal method employed in other systems.

The detection sensor 406 comprises a difference amplifier in series with a standard inverter. One input is connected to the second delay tap and the other to a calibration potentiometer 426. Although the second output tap is coupled to the detection sensor in this preferred embodiment, any of the other output taps may be used, or it is possible to utilize the undelayed peak echo itself as the standard for comparison. Accordingly, the energy in the input pulse is compared to the energy thus set into the difference amplifier; and, if the input energy is equal to or greater than the standard, a pulse is emitted at output terminal 428 to indicate a valid target.

AND circuit 408 senses the presence of a range signal from range sensor 402 and a valid target signal from detection sensor 406. If both these signals are present, it transfers a signal to all the AND circuits in the range readout 300.

Range counters

A radar sector under scan is divided into eight small divisions called coarse range blocks. These blocks are obtained by dividing the sector radius into eight equal parts and drawing arcs of circles parallel to the sector arc. These arcs decrease in size from the sector arc to the origin of the angle which physically is the radar location. Since range is proportional to the time lapse between the sending out of the radar signal and the receipt of the echo, the particular coarse range block where the target is located may be determined. Increment counter 100 is a standard six stage counter which continually transfers signals to range readout 300 indicating the increment of a coarse range block corresponding to the present time. Coarse range counter 200 is a standard three stage counter which continually transfers signals to range readout 300 indicating the coarse range block corresponding to the present time. Both of these counters receive count advancing pulses from a system clock 500 which synchronizes them with the transmitted radar pulse resulting in the echo under analysis. For every count advancing pulse received by the coarse range counter 200, increment counter 100 receives sixty-four pulses since each coarse range block is divided into sixty-four increments. Counters 100 and 200 start counting in coincidence with the transmitted radar pulse, whereby the time of generation of an output signal by range sensor 402 is indicative of target range time which is measured by the data content of coarse range counter 200 and increment counter 100 at that time.

Range readout

Range readout 300 comprises nine AND circuits which serially feed into nine flip-flops. The AND circuits do not conduct when count pulses are received unless a range signal is also received from range time estimator 400. At this time, which is true range time, the range signal causes the AND circuits to open and transfer the data content of counters 100 and 200 to the flip-flops causing them to produce a nine bit word. Bits 1–3 indicate the coarse range block containing the valid target and bits 4–9 indicate where within this coarse range block the target appears. Accordingly, range time is compared with the reading of two counters to determine range in terms of a pertinent coarse range block and increments within that block.

The invention is not limited to the specifics of the preceding description of one illustrative embodiment, but embraces the full scope of the following claims.

What is claimed is:

1. For a radar system wherein a signal is sent out and upon impact with a target its echo is reflected back to a detector, an automated radar range estimator for producing a coarse estimate and a more exact estimate of the range of said target, said estimator comprising: a storage means; a source of timing pulses; a first counter connected between said timing source and said storage means and operative in response to said timing pulses to generate said coarse range estimate; a second counter connected between said timing source and said storage and operative in response to said timing pulses to generate said more exact estimate; and a range time estimator including means operative to determine the time corresponding to the weighted center of gravity of said reflected echo and means connected between said range time estimator and said storage means operative to generate a signal at this time to cause the contents of said counters to be read into said storage means.

2. For a radar system wherein a signal is sent out and upon impact with a target its echo is reflected back to a detector, an automated radar range estimator for producing a coarse range estimate and a more exact estimate of the range of said target, said estimator comprising: a source of timing pulses; gating means; a first counter connected between said timing source and said gating means and operative in response to said timing pulses to generate said coarse range estimates; a second counter connected between said timing source and said gating means and operative in response to said timing pulses to generate said more exact estimate; and, a range time estimator including a delay line having a plurality of taps operative to process said target reflected echo, a first weighting matrix of impedance elements having an input connected to substantially the first half of said delay line taps and a common output, a second weighting matrix of impedance elements having an input connected to substantially the second half of said delay line taps and a common output, and a signal comparison circuit connected between said first and second weighting matrix output circuits and said gating means and arranged to provide an output signal which causes the contents of said counters to pass through said gating means when the signal at said two common outputs are substantially equal.

3. For a radar system wherein a signal is sent out and upon impact with a target its echo is reflected back to a detector, an automated radar range estimator for producing a coarse estimate and a more exact estimate of the range of said target, said estimator comprising: a source of timing pulses; a first counter connected to said timing source and operative in response to said timing pulses to generate said coarse range estimate; a second counter connected to said timing source and operative in response to said timing pulses for generating said more exact estimate; a range time estimator; and, a range readout gating subsystem, said range time estimator including a delay line having a plurality of taps and operative to process said target reflected echo, a first weighting matrix of impedance elements having an input connected to substantially the first half of said delay line taps and a common output, a second weighting matrix of impedance elements having an input connected to substantially the second half of said delay line taps and a common output, a signal comparison circuit connected to said first and second weighting matrix output circuits and arranged to provide an output signal when the signals at said two common outputs are substantially equal, a reference source of signal energy, a detection sensor having a first connection to said reference source and a second connection to one of said taps and being arranged to provide an output signal when the signal energy at said first and second connections is substantially equal, and an AND gate connected to said comparison circuit and said detection sensor and arranged to provide an output signal for transferring the contents of said counters into said range readout gating subsystem when an output signal from said comparison circuit and said detection sensor coincide in time.

4. For a source of signal pulses, a signal timing system comprising: a digital counter subsystem operative to store a representation of time; and being synchronized with said pulses to be timed; and, means operative to provide a signal at the time corresponding to the weighted center of gravity of one of said pulses for causing the contents of said counter to be read out, said weighted center of gravity means including a delay line having a plurality of taps, a first weighting matrix of impedance elements having an input connected to substantially half of said delay line taps and a common output, a second weighting matrix of impedance elements having an input connected to substantially the second half of said delay line taps and a common output, and a signal comparison circuit connected to said first and second weighting matrix output circuits and said counter and arranged to provide said weighted center of gravity signal when the signals at said two common outputs are substantially equal.

5. A means for determining the time corresponding to the weighted center of gravity of a signal, comprising: a delay line having a plurality of taps for processing said signal; a first weighting matrix of impedance elements having an input connected to substantially half of said delay line taps and a common output; a second weighting matrix of impedance elements having an input connected to substantially the second half of said delay line taps and a common output; and, a signal comparison circuit connected to said first and second weighting matrix output circuits and arranged to provide a signal representative of said weighted center of gravity when the signals at said two common outputs are substantially equal.

References Cited by the Examiner

UNITED STATES PATENTS

| | | | |
|---|---|---|---|
| 2,922,965 | 1/60 | Harrison | 333—29 |
| 2,974,371 | 3/61 | Greanias | 333—29 |
| 3,012,721 | 12/61 | Fiske | 343—7.3 |
| 3,035,263 | 5/62 | Lader et al. | 343—7.3 |
| 3,037,166 | 5/62 | Alexander | 343—5 |
| 3,075,189 | 1/63 | Lisicky | 343—7 |

FOREIGN PATENTS 1,147,248  6/57  France.

OTHER REFERENCES

Krantz et al.: *A Survey of Digital Methods for Radar Data Processing*, Proceeding of Eastern Computer Conference, Dec. 13, 1960, pp. 68–83.

CHESTER L. JUSTUS, *Primary Examiner*.

KATHLEEN CLAFFY, *Examiner*.